United States Patent [19]

Nakano et al.

[11] Patent Number: 4,625,985
[45] Date of Patent: Dec. 2, 1986

[54] ANTI DIVE DEVICES FOR MOTORCYCLES

[75] Inventors: Yasuo Nakano; Toshiharu Yoshioka, both of Saitama, Japan

[73] Assignee: Honda Giken Kogyo Kabushiki Kaisha, Japan

[21] Appl. No.: 723,173

[22] Filed: Apr. 15, 1985

[51] Int. Cl.[4] .............................................. B62K 25/08
[52] U.S. Cl. ................................... 280/276; 180/219; 188/272; 188/346; 280/703
[58] Field of Search ................ 180/219; 280/276, 703; 188/272, 346, 313, 318

[56] References Cited

U.S. PATENT DOCUMENTS 4,295,658 10/1981 Kashima .............................. 280/276
4,515,384  5/1985 Honma et al. ...................... 280/276

FOREIGN PATENT DOCUMENTS 2047471  6/1971 Fed. Rep. of Germany ...... 188/346
56-6937  1/1981 Japan .................................. 280/703

Primary Examiner—David M. Mitchell
Assistant Examiner—Charles R. Watts
Attorney, Agent, or Firm—Wegner & Bretschneider

[57] ABSTRACT

An anti dive device for a motorcycle having a front wheel supported by front forks, each fork having an inner pipe and an outer case. The outer case of each front fork has two chambers filled with working fluid, at least two working fluid passages of different sizes between the two chambers, and elements to select which passage is open between the chambers. The device further has two brake assemblies and a hydraulic pressure generator. When braking torque is applied to the first brake assembly, a caliper bracket connected to the first brake assembly activates the hydraulic pressure generator, causing the activation of the second brake assembly as well as the selection of the smaller working fluid passage. Restricting the size of the passage causes the fork suspension to stiffen, thus preventing the motorcycle from nosediving upon braking.

5 Claims, 2 Drawing Figures

ANTI DIVE DEVICES FOR MOTORCYCLES

FIELD OF THE INVENTION AND RELATED ART STATEMENT

The present invention relates to an anti dive device for motorcycles designed to automatically relieve nose diving wherein the front suspension dives by shifting of the center of gravity during braking, depending upon a braking force, thereby producing a comfortable braking effect.

With conventional anti dive devices for motorcycles including working fluid passages of smaller and larger diameters in the hydraulic suspension of the front fork thereof, a control piston is generally actuated to close up the larger diameter passage or adjust the degree of opening thereof, whereby a flow of the working fluid passing through the larger diameter passage is cut off to allow it to pass through the smaller diameter passage, or the amount of the working fluid passing through the larger diameter passage is reduced, thereby bringing about an increase in damping force. In the prior art, that control piston is driven either by direct introduction of a hydraulic pressure generated in the master cylinder of the brake means, or by indirect or direct action of a braking torque acting upon the caliper of the front disk brake. However, the former driving system offers a problem that, since a hydraulic pressure generated in a single master cylinder gives a push to the piston of the brake caliper and a push to the control piston of the anti dive device, the amount of oil to be supplied from that master cylinder is so increased that a proper sense of manipulation of the brake lever corresponding to braking the force is adversely affected. In the latter driving system, there also arises a problem that the degree of freedom allowed for the design of the front forks is diminished due to the limitations in design imposed upon the parts for the front forks.

OBJECT AND SUMMARY OF THE INVENTION

The present invention has been accomplished in view of the foregoing, and has for its object to provide an anti dive device for motorcycles which has a smaller number of working parts, operates reliably without adversely affecting a sense or manipulation of a brake lever, and makes the design of front forks easy.

According to the present invention, the aforesaid object is achieved by the provision of an anti dive device for a motorcycle having a front wheel supported by front forks and provided with a first brake means wherein a braking torque generated in said first brake means is transmitted through a caliper bracket of said first brake means to a hydraulic pressure generator, which in turn generates a hydraulic pressure to actuate second brake means. The anti dive device is characterized in that provision is made of an anti dive means for selecting working fluid passages in a hydraulic suspension of the front forks during breaking to increase the damping force of said hydraulic suspension. The anti dive means further has a branched pipe between said hydraulic pressure generator and said second brake means, thereby to actuate said anti dive means by said hydraulic pressure generated in said hydraulic pressure generator. Thus, according to the present invention, only braking due to the first caliper in the first master cylinder is manipulated directly by the brake lever, so that it is possible to decrease the amount of oil to be supplied to the first master cylinder. In addition, since the hydraulic pressure generator to be operated by a braking torque is formed separately from the anti dive device, and is connected thereto by way of a branched pipe, the design of the front forks is made easy.

BRIEF DESCRIPTION OPF THE DRAWINGS

One embodiment of the present invention is illustrated in the drawings, in which FIG. 1 is a perspective view showing part of a motorcycle including the anti dive device, and FIG. 2 is a sectioned from view of the anti dive device.

DETAILED DESCRIPTION OF PREFERRED EMBODIMENTS

Figure 1:
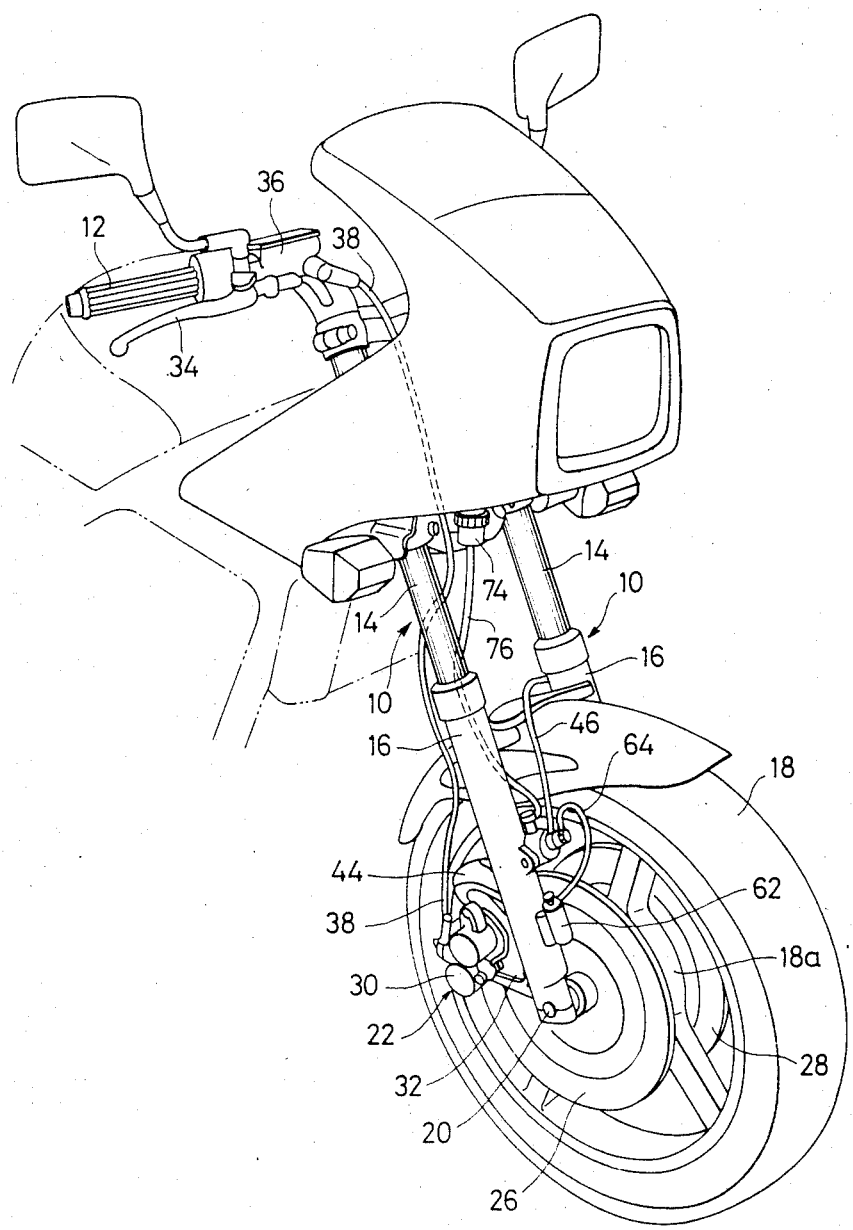
Figure 2:
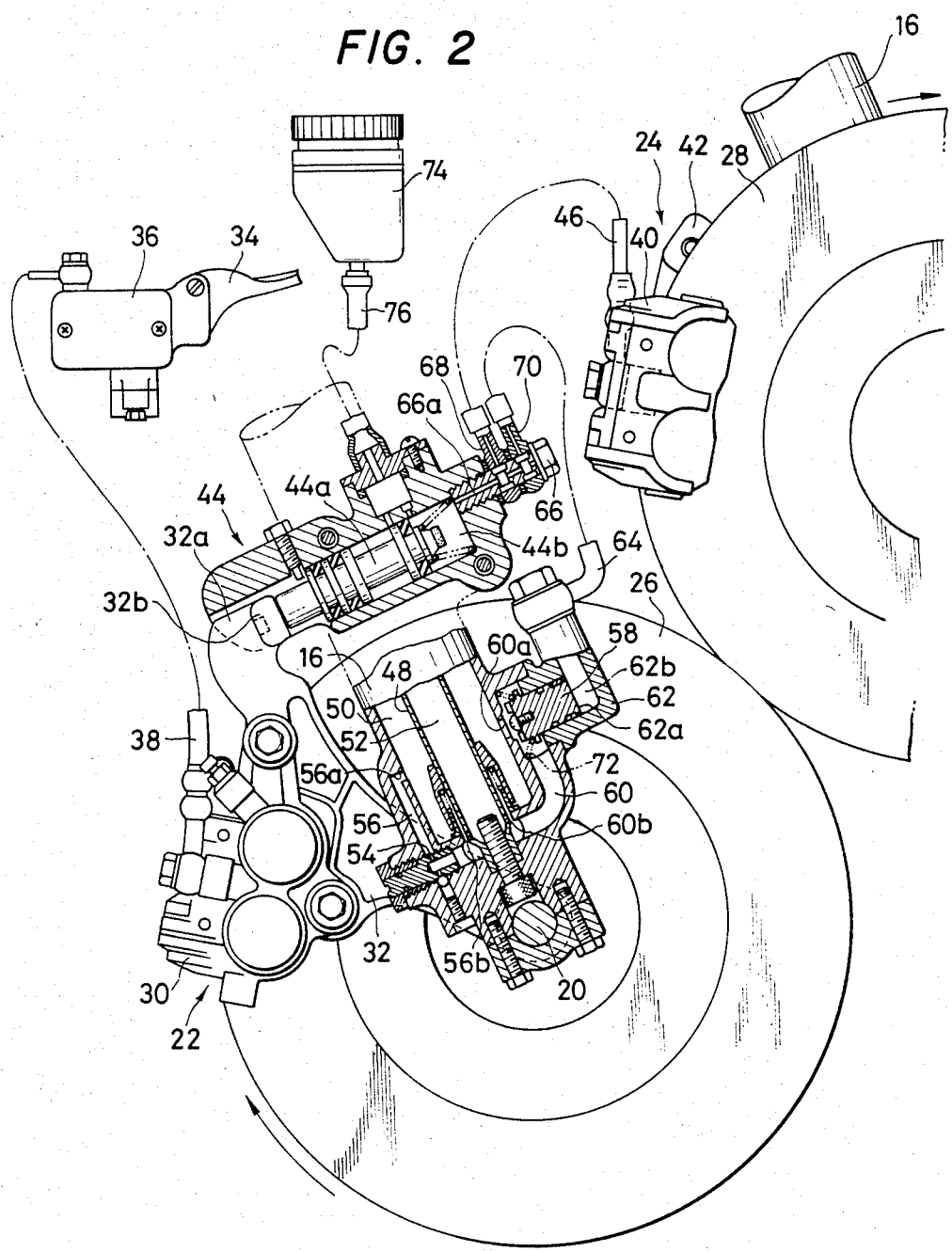

In the following, the present invention will now be explained with reference to one embodiment of the anti dive device incorporated into a motorcycle provided with two sets of disk brake means in a front wheel supported by telescopic front forks.

Telescopic type front forks 10, 10 include inner pipes 14, 14 connected at the upper ends to a handlebar 12, and the lower portions of which are fluid-tightly inserted into bottom cases 16, 16 in an axially movable manner. A working liquid filled in the bottom cases 16, 16 and fork springs and rebound springs mounted in the inner pipes 14, 14 are combined with a shock absorber mechanism (not illustrated) comprising air, pistons, etc. to produce a comfortable front suspension effect.

Between the lower ends of the bottom cases 16, 16 of the front forks 10, 10, a front wheel 18 is rotatably supported by a front axle 20. That wheel 18 is provided on both sides with first and second brake means 22 and 24. More specifically, a brake disk 26 of the first brake means 22 attached on one side of the wheel 18 and a brake disk 28 of the second brake means 24 attached on the other side are opposed to each other through a hub 18a of the wheel 18, and are rotatable in unison with the wheel 18. A first caliper 30 includes two series of parallel type cylinders adapted to clamp therebetween the brake disk 26 of the first brake means 22 for braking, and is bolted to one end of a caliper bracket 32 which is rotatably fixed at the lower end to the front axle 20. In between the action and reaction portions of the first caliper 30 there is loosely fitted the brake disk 26. The first caliper 30 is connected with a first brake hose 38 for the introduction of a pressurized fluid to be generated in a first master cylinder 36 by the braking manipulation of a brake lever 34 attached to the handlebar 12.

On the other hand, a second caliper 40 is adapted to clamp therebetween the brake disk 28 of the second brake means 24 for braking, and is secured through a bracket 42 to the bottom case 16 of the front fork 10 located on the side of the brake disk 28. The brake disk 28 is loosely fitted into the second caliper 40. The second caliper 40 is connected with a second brake hose 46 for the introduction of a pressurized liquid to be generated by giving a push to a piston 44a of a second master cylinder 44 by way of an action protuberance 32a extending from the side of the first caliper 30, out of which the disk 26 rotates.

As explained above, the lower portion of the inner pipe 14 of the front fork 10 located on the side of the first brake means 22 is fluid-tightly inserted into the bottom case 16 in an axially movable manner. The bottom case 16 is divided into an outer chamber 50 and an inner chamber 52 by an inner cylinder 48, said chambers 50 and 52 communicating with each other by way of a working fluid passage 56 of a smaller diameter, which includes an orifice 54, and a working liquid fluid passage 60 of a larger diameter, at the top of which one end of a control piston 58 is situated, said piston being designed to close up that passage and adjust the degree of opening thereof. A working liquid is filled within said outer and inner chambers 50 and 52 as well as within both passages 56 and 60.

The control piston 58 is opposed at one end to an opening 60a of the larger diameter passage 60, which is situated on the side of the outer chamber 50, and is fluid-tightly and slidably inserted at the other end into a cylinder portion 62a of an anti dive case 62 secured to the bottom case 16. A hydraulic chamber 62b is defined within the anti dive case 62 and in the rear of the control piston 58, and is connected with an anti dive hose 64 for the introduction of a hydraulic pressure to be generated in the second master cylinder 44.

It is to be understood that reference numeral 32b stands for engagement means which is formed at the end of the action protuberance 32a of the caliper bracket 32, and engages the second master cylinder 44 to stop the caliper bracket 32 from excessively rotating with the brake disk 26, 44b is a hydraulic chamber of the second master cylinder 44, 56a is an opening of the working fluid passage 56 located on the side of the outer chamber 50, 56b is an opening thereof located on the side of the inner chamber 52, 60b is an opening of the working fluid passage 60 located on the side of the inner chamber 52, 66 is a union bolt threaded to the discharge portion of the hydraulic chamber 44b of the second master cylinder 44 and having a liquid passage 66a through the central portion, 68 is a fitting attached to the end of the second brake hose 46 and fitted into and connected to the union bolt 66, 70 is a fitting attached to the end of the anti dive hose 64, 72 is a return spring of the control piston 58, 74 is a reservoir for supplying a working liquid to the second master cylinder 44, and 76 stands for a reservoir hose for supplying a working liquid from the reservoir 74 to the second master cylinder 44.

The foregoing embodiment operates as follows.

When the rider manipulates the brake lever 34 for braking, the brake disk 26 rotating in unison with the front wheel 18 and is clamped in between the first caliper 30 by a hydraulic pressure generated in the first master cylinder 36, so that the first brake means 22 applies the brakes. At this time, the first caliper 30, which clamps therebetween the brake disk 26, rotates under the action of a braking torque, using as the fulcrum the front axle 20 supporting the fixed end of the caliper bracket 32. As the first caliper 30 rotates, the action protuberance 32a of the caliper bracket 32 gives a push to the rear end of the piston 44a of the second master cylinder 44, and braking is effected by the first brake means 22 at the position where the piston 44a reaches the advance limit.

Then, when the pressure is increased within the hydraulic chamber 44b of the master cylinder 44 having its piston pressed, a pressurized liquid is supplied to the second caliper 40 by way of the second brake hose 46 connected by the union bolt 66 to the discharge side of the hydraulic chamber 44b to clamp the brake disk 28 of the second brake means 24, whereby braking is applied on the front wheel 18 by the second caliper. On the other hand, a pressurized liquid is supplied to the hydraulic chamber 62b of the anti dive case 62 by way of the anti dive hose 64 connected by the union bolt 66 to the discharge side of the second master cylinder 44 along with the second brake hose 46 to give a push to the control piston 58 inserted into the cylinder portion 62a of the anti dive case 62. The end of the control piston 58 thereby closes up the opening 60a, positioned on the side of the outer chamber 50, of the working fluid passage 60 which makes communication between the outer and inner chambers 50 and 52 within the bottom case 16 of the front fork 10. Thus, as the weight of the motorcycle and the rider move forward during braking, the load applied on the front suspension system allows the inner pipe 14 to compress the working fluid within the outer chamber 50 of the bottom case 16. In consequence, the working fluid can pass from the outer chamber 50 to the inner chamber 52 only by way of the passage 56 of a smaller diameter. Since the orifice 54 is then formed in that fluid passage 56, the amount of the fluid to flow into the inner chamber 52 is so reduced that a sharp nose dive can effectively be avoided.

In the illustrated embodiment, the anti dive hose 64 for feeding a pressurized liquid to the anti dive device is connected by the union bolt 66 on the discharge side of the second master cylinder 44 together with the second brake hose 46. According to another embodiment of the present invention, however, it may be connectedly branched out of a portion of the second brake hose 46 between the second master cylinder 44 and the second caliper 40.

It is to be understood that the anti dive device according to the present invention is applicable to not only motorcycles but also automotive three-wheeled vehicles, etc.

What is claimed is:

1. An antidive device for a motorcycle having a front wheel supported by forks, comprising:
   (a) each of said forks having an inner pipe and an outer case axially slidably connected, said outer case having an inner chamber and an outer chamber filled with a working fluid;
   (b) at least two working fluid passages of different sizes connecting said inner chamber and said outer chamber;
   (c) a first brake means and a second brake means; ;
   (d) a hydraulic pressure generator;
   (e) said first brake means comprising a rotatable caliper bracket which actuates said hydraulic pressure generator, which in turn generates a hydraulic pressure;
   (f) means for transmitting said hydraulic pressure to said second brake means, thereby actuating said second brake means;
   (g) means, actuated by said hydraulic pressure, for selecting between the working fluid passages.

2. An antidive device according to claim 1, wherein said outer case has an inner cylinder axially disposed therein to define said inner chamber, said outer chamber being an annular chamber surrounding said inner cylinder.

3. An antidive device according to claim 1, wherein said first brake means further comprises a brake disk fixed to said wheel, a master cylinder, caliper means fixed to said bracket and actuated by said master cylinder to clamp on said disk, said bracket being rotatably mounted such that it rotates when said caliper means clamps onto said disk.

4. An antidive device according to claim 3, wherein said bracket has a protuberance extending therefrom, said hydraulic pressure generator comprises a housing defining a cylinder therein and a piston disposed in said last-mentioned cylinder, one end of said last-mentioned piston protruding through said housing, said protuberance bearing against said one end of said piston to thereby generate said hydraulic pressure when said bracket rotates.

5. An antidive device according to claim 1, comprising two working fluid passages, and wherein said actuating means comprises a hydraulic cylinder operatively connected to said pressure generator and a control piston disposed in said hydraulic cylinder, said control piston being disposed such that it closes the larger of said fluid passages responsive to said hydraulic pressure.

* * * * *